(12) United States Patent
Ylonen

(10) Patent No.: US 7,952,500 B2
(45) Date of Patent: May 31, 2011

(54) SERIALIZATION OF SHARED AND CYCLIC DATA STRUCTURES USING COMPRESSED OBJECT ENCODINGS

(75) Inventor: Tatu J Ylonen, Espoo (FI)

(73) Assignee: Tatu Ylonen Oy, Espoo (FI)

( * ) Notice: Subject to any disclaimer, the term of this patent is extended or adjusted under 35 U.S.C. 154(b) by 384 days.

(21) Appl. No.: 12/360,202

(22) Filed: Jan. 27, 2009

(65) Prior Publication Data

US 2010/0191777 A1     Jul. 29, 2010

(51) Int. Cl.
*H03M 9/00*     (2006.01)
(52) U.S. Cl. ............... 341/100; 341/101; 341/50
(58) Field of Classification Search ......... 341/100, 341/101, 50, 51, 65, 67, 60
See application file for complete search history.

(56) References Cited

U.S. PATENT DOCUMENTS

| | | | |
|---|---|---|---|
| 4,803,651 A | 2/1989 | Galkowski | |
| 5,546,575 A | 8/1996 | Potter | |
| 6,301,585 B1 | 10/2001 | Milne | |
| 7,415,704 B2 | 8/2008 | Schmidt | |
| 2002/0031126 A1* | 3/2002 | Crichton et al. | 370/394 |
| 2006/0085433 A1 | 4/2006 | Bacon | |
| 2006/0269148 A1 | 11/2006 | Farber | |

OTHER PUBLICATIONS

Dongmei Gao: A Java Implementation of the Simple Object Access Protocol, MSc Thesis, Florida State University, 2001.
D. Bobrow and D. Clark: Compact Encodings of List Structure, ACM Transactions on Programming Languages and Systems, 1(2):266-286, 1979.
R Sipala: Compact Storage of Binary Trees, ACM Transactions on Programming Languages and Systems, 4(3):345-361, 1982.
Jon White: Address/memory management for a gigantic LISP environment or, GC considered harmful, Conference on LISP and Functional Programming, ACM, 1980, pp. 119-127.
Z. Shao et al: Unrolling lists, Conference on LISP and Functional Programming, ACM, 1994, p. 185-195.
Martin Elsman: Type-Specialized Serialization with Sharing, in Sixth Symposium on Trends in Functional Programming (TFP'05), Tallinn, Estonia, Sep. 2005.
R. Van Engelen et al: Toward Remote Object Coherence with Compiled Object Serialization for Distributed Computing with XML Web Services, Workshop on Compilers for Parallel Computing (CPC), 2006, pp. 441-455.
ITU-T Recommendation X.691 ASN.1 encoding rules: Specification of Packed Encoding Rules (PER). International Telecommunication Union, 2002.
HDF5 User's Guide, Release 1.8.2, The HDF Group, Nov. 2008, (especially pp. 115-154).
C. Queinnec: Marshaling/demarshaling as a compilation/interpretation process, Parallel and Distributed Processing (IPPS/SPDP), IEEE, 1999, pp. 616-621.
M. Philippsen and B. Haumacher: More Efficient Object Serialization, in Parallel and Distributed Processing, Springer, 1999, pp. 718-732.
"Row Compression in DB2 9", http://www.ibm.com/developerworks/db2/library/long/dm-0610chang/.
"s11n—an Object Serialization Framework for C++", documentation from libs11n 1.2.8, Sep. 8, 2008 (especially pp. 58-63).
F. Breg: Java Virtual Machine Support for Object Serialization, in Java Grande/ISCOPE, ACM, 2001, pp. 173-180.
"NxCore Data Feed Executive Summary", www.nanex.net/NxCore/NxCore.htm.

(Continued)

*Primary Examiner* — Peguy JeanPierre

(57) ABSTRACT

A method of encoding data structures using compressed object encodings during serialization. A compressed representation of the data is generated directly while encoding. Serialization means converting a data structure to a string of bytes for external storage or communication.

20 Claims, 4 Drawing Sheets

OTHER PUBLICATIONS

"Nanex Compression on an OPRA Direct Feed", www.nanex.net/OPRADirect/OPRADirect.htm.

B. Carpenter et al: Object Serialization for Marshalling Data in a Java Interface to MPI, JAVA'99, ACM, 1999, pp. 66-71.

J. Maassen et al: Efficient Java RMI for Parallel Programming, ACM Transactions on Programming Languages and Systems, 23(6):747-775, 2001.

D. Rand: The PPP Compression Control Protocol, RFC 1962, IETF, 1996.

A. Shacham et al: IP Payload Compression Protocol (IPComp), RFC 3173, IETF, 2001.

G. Pelletier et al: RObust Header Compression Version 2 (ROHCv2), RFC 5225, IETF, 2008.

\* cited by examiner

SERIALIZATION OF SHARED AND CYCLIC DATA STRUCTURES USING COMPRESSED OBJECT ENCODINGS

CROSS-REFERENCE TO RELATED APPLICATIONS

Not Applicable

INCORPORATION-BY-REFERENCE OF MATERIAL SUBMITTED ON ATTACHED MEDIA

Not Applicable

TECHNICAL FIELD

The invention relates to software technology, particularly encoding data for external storage and transmission in a computer system.

BACKGROUND OF THE INVENTION

Serialization of data structures (also called linearization or marshalling) means converting a more or less arbitrary data structure to a string of bytes (or words), such that the bytes can be, for example, written to a file, stored in a database, sent over a network to another computer, migrated, or shared in a distributed object system. The bytes contain an encoding of the data structure such that it can later be read in (possibly in a different computer or a different program) and the original data structure restored.

Serialization is readily available in some programming languages or run-time libraries, including Java and C#. Many serialization implementations only support non-cyclic data structures; however, some support arbitrary cyclic or shared data structures and preserve any sharing. The serialization result can be either text (e.g., XML) or binary data. Clearly, the serialization result (typically a file) can also be compressed using any known compression algorithm suitable for compressing files or data streams.

The term serialization is frequently used to refer to synchronization of operations in concurrent programs, which meaning is completely different from the meaning used herein. The term linearization has a separate meaning in garbage collection, where it refers to relocating objects that reference each other so that they reside in nearby memory addresses, in order to improve cache locality.

A fairly detailed example of serializing cyclic objects is provided in Dongmei Gao: A Java Implementation of the Simple Object Access Protocol, MSc Thesis, Florida State University, 2001, where an algorithm for serializing a cyclic data structure into XML format for use in an RPC implementation is described in Chapter 3, which is hereby incorporated herein by reference.

General information on various data compression methods can be found in the book I. Witten et al: Managing Gigabytes: Compressing and Indexing Documents and Images, 2nd ed., Morgan Kaufmann, 1999.

Huffman coding (Huffman, D.: A method for the construction of minimum-redundancy codes, Proc. Inst. Radio Engineers 40(9):1098-1101, 1952) is an old and widely known data compression method. In general-purpose compression applications it has long since been surpassed by more modern compression techniques, such as arithmetic coding, Lempel-Ziv, Lempel-Ziv-Welch, L Z-Renau, and many other systems. Several variations of Huffman coding exist for compressing dynamic data streams, i.e., data streams where the frequency distribution of the various tokens to be compressed is not known a priori or may change dynamically with time, even during the compression of a single data stream. Examples of dynamic Huffman coding schemes include J. Vitter: Design and Analysis of Dynamic Huffman Codes, J. ACM, 34(4):825-845, 1987; Y. Okada et al: Self-Organized Dynamic Huffman Coding without Frequency Counts, Proceedings of the Data Compression Conference (DCC '95), IEEE, 1995, p. 473; D. Knuth: Dynamic Huffman coding, J. Algorithms 6:163-180, 1985; and R. Gallager: Variations on a theme by Huffman, IEEE Trans. Inform. Theory, IT-24:668-674, 1978. A particularly fast dynamic Huffman coding method that uses periodic regeneration of the Huffman coding trees and precomputation to speed up operations was disclosed in the U.S. patent application Ser. No. 12/354,835 by the same inventor, which is incorporated herein by reference.

There are a number of known data formats and protocols that support compression. Compressed image and video formats, such as TIFF, GIF, PNG, JPEG, and MPEG, encode many rows of pixels using compression, sometimes combining information from multiple rows (e.g. by using the discrete cosine transform) or multiple frames. IP Compression (RFC3173), PPP Compression Control Protocol (RFC1962), and IP header compression (RFC5225) are examples from the data communications field. The ITU-T X.691 (ASN.1 Packed Encoding Rules) is a standard for compact encoding of data.

HDF5 (Hierarchical Data Format 5) is a data format for large data sets; it is widely used in e.g. scientific computing and visualization, and for other large data sets such as stock market data or network monitoring data. It supports filters on data fields, including filters that perform compression. The HDF5 User's guide mentions compression in many places, and pages 115-154 specifically discuss filters and compression.

A number of companies have developed compact encodings for stock market data. The NxCore product from DTN/Nanex is one; however, no description of its data format is available. A detailed description of one stock market data encoding method is given in US patent application 20060269148.

In database systems, individual records or individual fields can be compressed, and the best type of compression to apply to a field can be detected automatically. An example is described in U.S. Pat. No. 5,546,575. A similar feature is called "Row Compression" in the DB2 database system.

In some Lisp systems and other programming environments, packed representations are used for data structures in memory. D. Bobrow and D. Clark: Compact Encodings of List Structure, ACM Transactions on Programming Languages and Systems, 1(2):266-286, 1979, describes several space-efficient encodings for list data structures (it should be noted that they use the term linearization in its garbage collection meaning). Other references to compactly representing data structures include P. Sipala: Compact Storage of Binary Trees, ACM Transactions on Programming Languages and Systems, 4(3):345-361, 1982; Jon White: Address/memory management for a gigantic LISP environment or, GC considered harmful, Conference on LISP and Functional Programming, ACM, 1980, pp. 119-127; Z. Shao et al: Unrolling lists, Conference on LISP and Functional Programming, ACM, 1994, p. 185-195; Martin Elsman: Type-Specialized Serialization with Sharing, in Sixth Symposium on Trends in Functional Programming (TFP '05), Tallinn, Estonia, September 2005; R. van Engelen et al: Toward Remote Object Coherence with Compiled Object Serialization for Distributed Computing with XML Web Services, Workshop on Compilers for Parallel Computing (CPC), 2006, pages 441-455; M. Philippsen and B. Haumacher: More Efficient Object Serialization, in Parallel and Distributed Processing, Springer, 1999, pp. 718-732.

These applications are, however, different from serializing arbitrary cyclic and/or shared data structures of a program into an external representation from which the same data structures can be read into memory. Serialization as used here is an automatic process, where the application generally only specifies the data structure to be serialized, and gets back a string of bytes (possibly directly written to a file or a communications socket). While some languages, such as Java, allow specifying custom serialization functions for object classes, the process is still driven automatically, with the serialization system traversing the object graph, detecting cycles and sharing, and performing the appropriate encoding on the objects such that they can be restored. The function for deserializing an object graph is generally given a string (or a file or communications socket where the data is read), and returns a data structure, without requiring further interaction with the application. Serialization as used here is thus a rather different operation from image or video compression, or the compression of IP packets, the compression of stock market data, or improving locality during garbage collection.

There are applications, such as large knowledge-based systems, where the data structures to be serialized are extremely large, and may grow to billions of objects in the near future. Such data structures also tend to be cyclic and have extensive sharing. Very fast and memory efficient serialization methods will be needed for serializing such data structures.

For example, consider loading knowledge into a future knowledge-intensive application during startup. Such applications may use knowledge bases of several terabytes, and may run on computers with tens or hundreds of gigabytes of main memory, and may require tens or hundreds of gigabytes of data to be loaded into main memory before they can operate at full performance.

Loading such data amounts from persistent storage into an application's memory can be quite time-consuming, especially if the loading is done over a communications network. For example, consider a computing cluster with a thousand computational nodes, each node loading 100 gigabytes of knowledge into its memory. The aggregate data amount is 100 terabytes; transmitting this over a network or out of a database at 10 gigabits per second would take 80000 seconds, or over 22 hours, just for the system to start up. Even just reading 100 gigabytes from current disks takes many minutes.

In such systems, it is important to compress the data, but since every node will need to also decompress the 100 gigabytes of data, decompression will need to be extremely fast.

If the 100 gigabytes represents 5 billion objects, at a mere 100 nanoseconds per object (which is probably highly optimistic) the decoding would take 500 seconds of CPU time, which is a long time to start up the application. It is thus important to be able to decode data very quickly even if the communication bottleneck is solved using other approaches. No known encoding/compression method is fast enough.

The example illustrates how important it is for such applications to be able to serialize large data structures into a compact format that can be decoded extremely quickly. Furthermore, since the data sets also need to be updated regularly, generating such compressed data sets must be fast.

BRIEF SUMMARY OF THE INVENTION

Serializing of data structures is improved by directly generating a compressed encoding as each object is encoded. This permits extremely fast coding techniques to be used, while still producing compact encoded data streams. Since the compression methods used can be specialized for the application, they can be made faster than general purpose compression methods that operate on just streams of bits.

The encoded data stream is structured as a stream of packets. Each packet comprises a variable number of bits, and need not be byte-aligned (that is, they may begin at any bit in the encoded data stream, not just byte boundaries). Each packet begins with an object type code, which is encoded using a compressing encoding for a single integer value that utilizes the skewed probability distribution of the type codes. Each packet may encode an object in the data structure being serialized, or may code special indicators, such as those relating to references to shared objects (including those belonging to cycles), or indications relating to an object potentially having multiple (more than one) references.

The encoding entirely leaves out pointers (except in cases of objects with multiple references), effectively coding them with zero bits, which makes the encoding of list structures, objects and arrays containing references to other objects extremely efficient.

The principal advantages of the present invention over the prior art are encoding and decoding speed and compactness of the encoded data stream. In practice modern superscalar processors tend to be memory bandwidth limited in decoding such encoded data streams, and using sufficiently fast compression algorithms much of the encoding and decoding work can be done "for free" while other execution units within the processor are waiting for data to arrive from memory. Even though the compression ratios achieved with many embodiments of the present invention remain somewhat below those achievable by state of the art compression algorithms for entire data streams, the method executes much faster, and the performance is critical when the data structures being encoded and decoded are extremely large.

BRIEF DESCRIPTION OF THE SEVERAL VIEWS OF THE DRAWING(S)

DETAILED DESCRIPTION OF THE INVENTION

Figure 1:
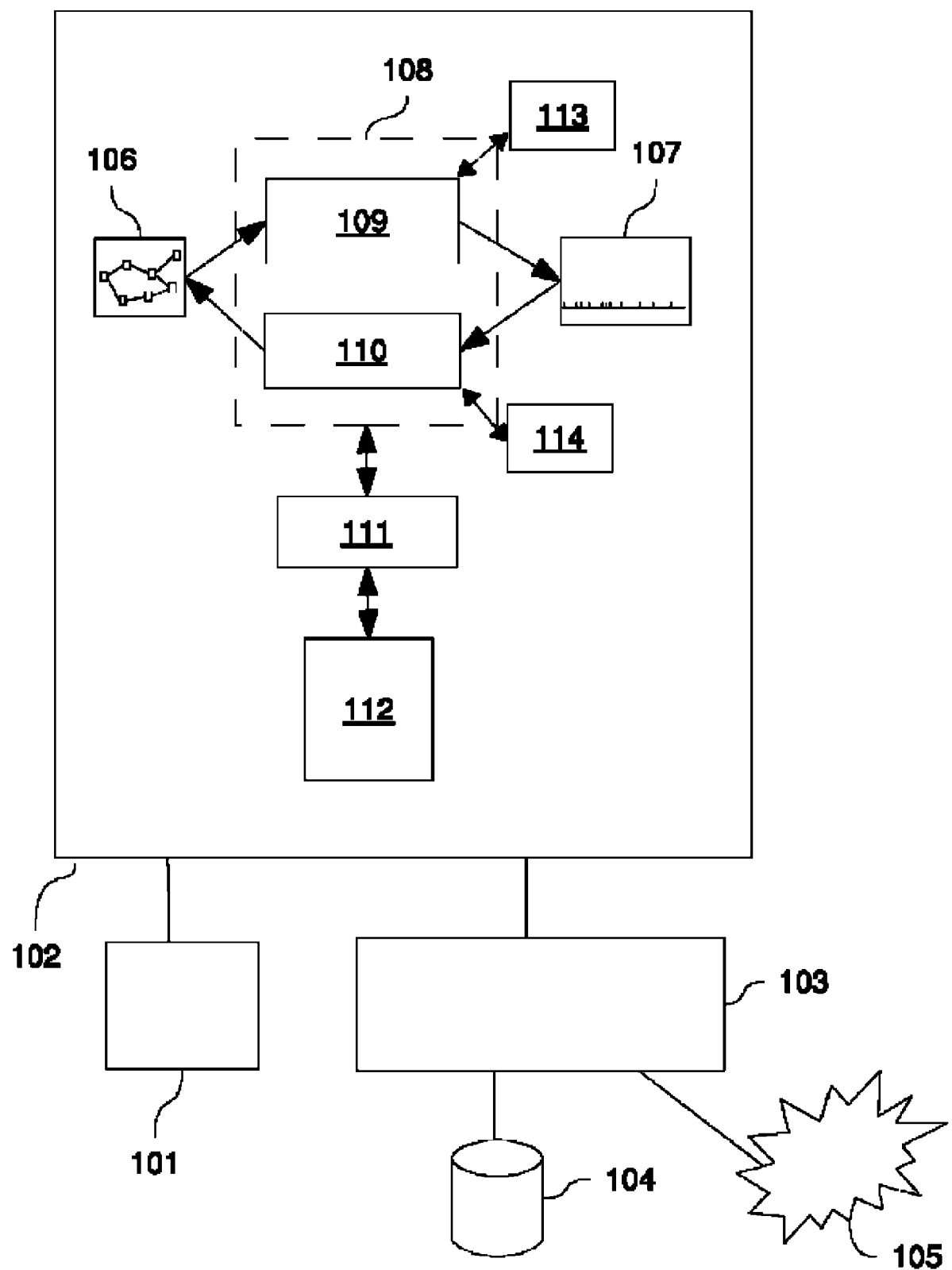
FIG. 1 illustrates a computer system that performs serialization and deserialization of shared and cyclic data structures using compressed object encodings, that is, converts between a first data structure comprising objects and a second data structure comprising packets (where a packet means an encoding consisting of a variable number of bits and comprising an encoded type code).

The invention can be seen as a method of converting between two data representations, a first data structure comprising objects and a second data structure comprising packets. The first data structure is typically in a format normally manipulated by an application program. The data objects contained in it can generally be of any types supported by the application program, including structures, class instances, strings, arrays, integers, floating point values, list nodes, etc. The first data structure is typically stored in the main memory of a computer. It is normally application data that controls (together with the program code) how the application operates. The conversion method would typically be called by the application, though it could also be called by the operating environment, e.g. to implement persistence for an application.

The second data structure is the encoded data stream that contains a compact encoded representation of the first data structure. The conversions are designed such that once the first data structure has been converted to the second data structure, a reverse conversion can be used (in the same or a different application, on the same or another computer) to convert the second data structure back to a data structure that is equivalent to the first data structure in some well-defined sense. Typically the equivalence would mean that it is equivalent in the sense used by the applicable programming language; it contains the same data values and they are of the same types as in the original. However, memory addresses in which the objects are stored will generally not be identical to those used in the original first data structure. An application would typically not keep both data structures in main memory except for short periods of time while they are being converted and read/written to storage or communicated over a network.

The second data structure will typically also reside in main memory, but could also be directly written to or read from non-volatile storage or a network interface. It could also be stored in a networked file system (e.g., on a file server or web server) or any other memory accessible to the computer, and thus the memory in which it resides is not necessarily local to the computer on which the conversion method executes.

As the conversion is performed, the method constructs one of the data structures from the other. When serializing, the second data structure is constructed from the first. When deserializing, the first data structure is constructed from the second.

The data structures can be extremely large, possibly comprising billions of objects or packets.

According to the invention, the data format used in the second data structure utilizes compressing encodings for at least a type code. A compressing encoding means one that utilizes information about the skewed distribution of type codes to encode the type code in a small number of bits. Examples of compressing encoding means include Huffman coding, dynamic Huffman coding, splay trees, arithmetic coding, the very fast approximate dynamic Huffman coding scheme with periodic regeneration and precomputation described in the U.S. patent application Ser. No. 12/354,835.

Several independent compressing coders can be used for different fields of data objects. The different fields may utilize a different compression algorithm, or they may use the same coding method but with a separate context (and separate statistics for distribution). In the preferred embodiment the context used encoding the type code is not used for any other purpose.

The second data structure is preferably packed as tightly as possible without causing excessive CPU overhead. The packets stored in it preferably have a variable number of bits (that does not need to be any particular multiple). The packets are preferably stored immediately after each other, without any intervening padding. As a consequence, at least some of the packets will not be byte-aligned.

The invention is intended for encoding first data structures that may include shared objects and cycles (that is, objects with more than one reference).

A known method for encoding such data structures (see Gao) uses hash tables at the encoding end, trying to find each object being encoded from the hash table, and encodes the object using a reference encoding that includes an identifier for the object if the object has multiple references. Known methods perform two passes over the data structure to determine which objects have multiple references, and/or the decoder adds all decoded objects into a suitable data structure (typically a hash table).

The invention in its preferred embodiment improves over the known methods in a number of ways. First, fast compressing encoding is used for at least the type code of each packet, reducing space and CPU overhead. Most pointers are not encoded at all (i.e., have zero-length encoding), which is achieved by ordering data in the second data structure appropriately. Second, indicators are sent by the encoder whenever an object may have more than one reference. The indicators do not necessarily contain any identifiers; instead, identifiers are preferably allocated (obtained) implicitly by the transmitter and the receiver. An extensible array is used in the receiver to save only those objects for which an indicator is received, significantly reducing memory overhead in the receiver and increasing its speed.

A computer system according to an embodiment of the invention is illustrated in FIG. 1. (101) illustrates one or more processors, (102) illustrates the main memory of the computer, comprising both programs and data, (103) illustrates I/O facilities, (104) illustrates a non-volatile storage subsystem, and (105) illustrates a data communication network (which may, among other things, be used to reach other non-volatile storage systems).

A conversion means (108) is a specialized machine or machine element comprising a serialization means (109) and/or a deserialization means (110). The serialization means is preferably a section of executable program code as part of the computer, though it could also be a specialized processor or custom logic, and it is configured to perform approximately the process described in FIGS. 2 and 3 and in the claims. The deserialization means is likewise preferably a section of executable program code as part of the computer, though it could also be a specialized processor or custom logic, and it is configured to perform approximately the process described in FIG. 4 and the claims. The operation of the serialization means (e.g., which branches to take or which logic circuits to activate, and what kind of second data structure to construct) is controlled, in addition to any program code, by the first data structure. Correspondingly, the operation of the deserialization means is controlled, in addition to any program code, by the second data structure. A primary purpose of the first data structure is to configure and control the operation of an application program, and a primary purpose of the second data structure is to later reconfigure the same or a different computer such that at least some aspects of the previous configuration of the computer as it is running the application program are restored. A conversion means may comprise both a serialization means and a deserialization means, or just one of them.

The first data structure (106) is read by and controls the operation of the serialization means (109) that constructs the second data structure (107) from it. The conversion in the reverse direction is performed by the deserialization means (110), which reads and whose operation is controlled by the second data structure (107) and which constructs the first data structure (106).

While the first and second data structures are shown here only once, the intention is that multiple instances of each kind of data structure may exist and may be created dynamically and possibly in parallel. They are used in the singular in the description and claims to keep the language easier to follow.

The serialization means (109) uses an index data structure (113), such as a hash table, to map objects that may have multiple references to their identifiers. The address of the object or another suitable identifier for it would typically be used as the key into the hash table (if garbage collection is permitted during serialization, the identifier should preferably be one that does not change during garbage collection, though known "eq hashtable" implementation methods could be used to update keys in a hash table if addresses are used).

The deserialization means (110) uses a suitable data structure (114) for mapping identifiers received in reference encodings to the corresponding objects. In the preferred embodiment, the identifiers are integers, and the suitable data structure is an extensible vector. Any other index data structure could also be used, but they tend to be significantly slower.

Both the serialization means (109) and the deserialization means (110) use a compressing encoding means (111) for encoding or decoding a type code in each packet in the second data structure. The compressing encoding means uses a context data structure (112) that may contain frequency statistics, coding trees, precomputed tables, etc.

An aspect of the invention is a method for converting between the first data structure and the second data structure, in either or both directions, as described herein, constructing one of the data structures from the other. Both data structures control the operations of the computer (in addition to program code). In fact, the serialization process can be seen as constructing a program (the second data structure) and the deserialization process as executing that program on a highly specialized machine (the deserialization means (110)).

Figure 2:
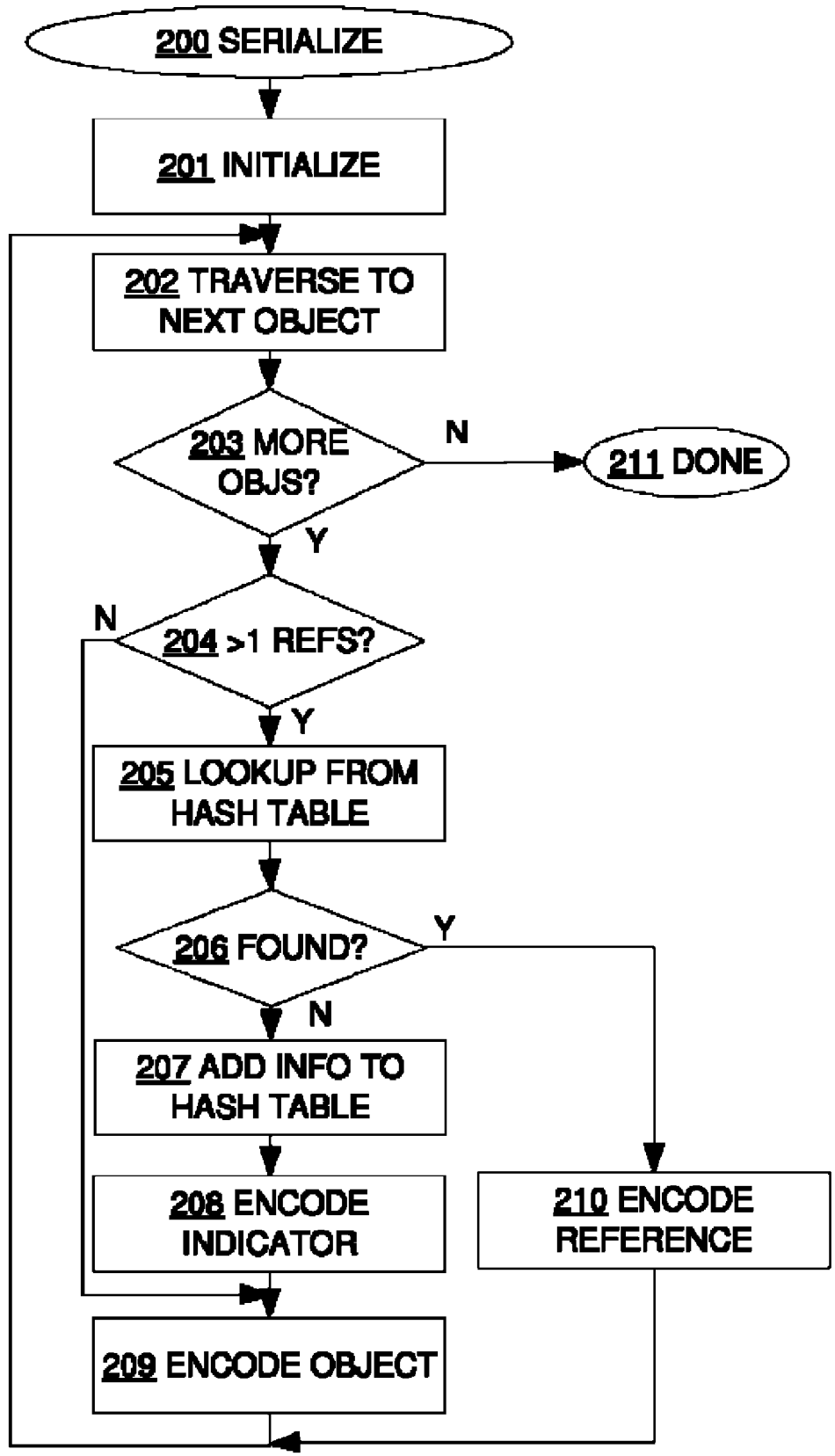
FIG. 2 illustrates the method for converting (serializing) a first data structure comprising objects into a second data structure comprising packets.

FIG. 2 illustrates an embodiment of the process implemented by the serialization means (109). (200) begins serializing (encoding) an object graph. (201) initializes the serialization process (e.g., initializes traversal, initializes an index data structure such as a hash table, skip list, or search tree, and outputs an initial header to the resulting data stream). (202) illustrates traversing the object graph; while it is shown as a box here, it would typically be a recursive function or an iterative function with some or all of the recursion eliminated by, e.g., using an explicit stack data structure, as is well known in the literature relating to eliminating recursion from functions. (203) illustrates testing if there are more objects; if not, serialization is complete at (211) (some terminal actions may be performed, including adding an end marker to the resulting data stream). In general, how to implement the traversal is known to one skilled in the art.

(204) illustrates testing whether the object may have more than one reference. This may, e.g., use information obtained in the first phrase in a two-phase serialization method, or may use information from the garbage collector in a one-phase serialization method (e.g., as described in U.S. patent application Ser. No. 12/356,104 by the same inventor, which is incorporated herein by reference). It tests whether the current object may have more than one reference. If it can be determined that there is no more than one reference, then there is no need to perform steps (205) to (210), resulting in significant reduction of work and memory consumption, as this is by far the most common case in many applications.

If the possibility of there being more than one reference cannot be excluded, execution continues from (205), where a lookup is performed from the index data structure (113) (for example, a hash table) to determine whether this object has been visited before. If it has been visited before (information was found in (206)), execution continues from (210) to encode a compressed reference to the object (see below for details), and objects referenced from the current object will not be traversed again. Otherwise information about the object will be added into the index data structure (207), an indication of the object potentially having multiple references is encoded in some embodiments (208), and execution continues from (209) to encode the object. This encoding generates a compressed encoding, as described below.

The information stored into the index data structure (113) typically comprises an identifier for the object that can be used to refer to it.

The identifier in a reference encoding may be the same as the identifier used as key in (113), or may be a different identifier, such as a memory address of the object, a unique identifier for the object instance, a sequence number of the object among all objects in the encoded data stream, a sequence number of objects that may have more than one reference, or, e.g., any known persistent or global identifier for the object. In the preferred mode it is a monotonically increasing sequence number of the object among those objects that may have more than one reference, and an indication whether the object may have more than one reference is encoded before the object in step (208).

Figure 3:
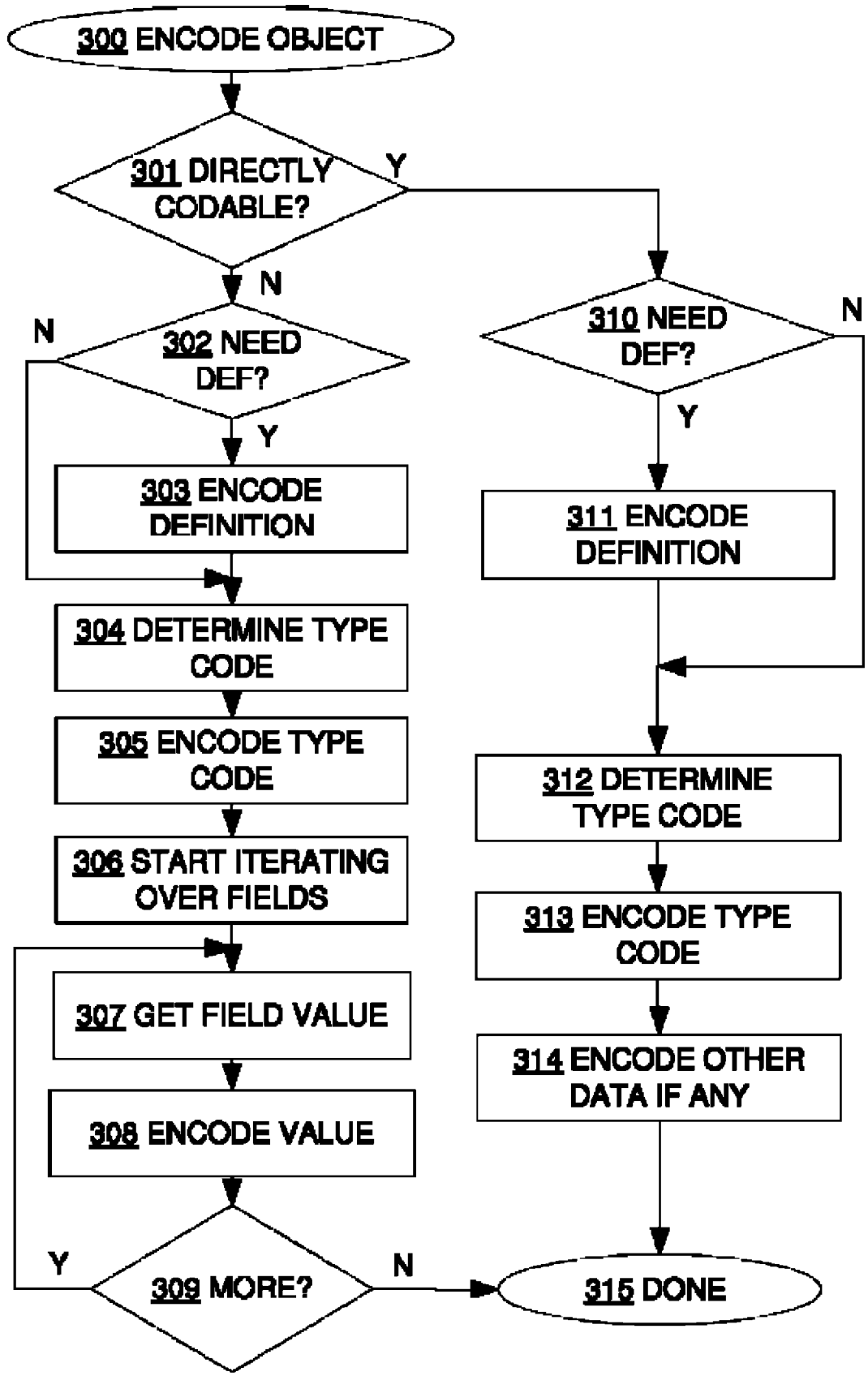
FIG. 3 illustrates encoding an object using compressed object encodings.

FIG. 3 illustrates generating a compressed encoding for an object. In the preferred embodiment, each object begins with a type code encoded using a compressing encoding that utilizes the skewed distribution of type codes. It is expected that in most applications a few type codes will be used very frequently, whereas most type codes are relatively rare.

Encoding begins at (300). First it is checked whether the given object can be directly coded (301). Directly codable means that the object has no fields (objects such as pairs or arrays may be considered either directly codable or not, depending on the embodiment). Typical examples of directly codable values include boolean values, integers, floating point values, symbols, etc. A typical example of a non-directly codable value would be a class instance, and in many embodiments, also list nodes, arrays, etc.

Looking first at the encoding process for objects, (302) checks if a definition needs to be encoded for the object. This would typically be done for class instances or structures, where a definition of the class or structure could be encoded in (303). It is generally known how to encode such definitions (e.g., the binary serializer for Java encodes class definitions, and even though they use different coding, a person skilled in the art could easily adapt the encoding for use with embodiments of the present invention). Since only a few definitions are likely to be generated, it is not necessary to compress them (however, a special type code would preferably be allocated for a definition, and encoded at the beginning of the definition, so that it can be properly decoded). In the preferred embodiment the coding of the definition uses the same compressing encodings as object encodings, but with different contexts.

At (304), the appropriate type code for the object is determined (this step could also be performed before (302) or in conjunction with it).

The type code is encoded at (305). A compressing encoding method that utilizes the skewed distribution of type codes is used. Any suitable known or future encoding method can be used. Examples of compressing encoding methods include Huffman coding, dynamic Huffman coding, splay trees, arithmetic coding, and the very fast approximate dynamic Huffman coding scheme with periodic regeneration and precomputation described in the U.S. patent application Ser. No. 12/354,835 (the last one being the preferred method).

Step (306) illustrates starting to iterate over fields of the object in some specific order. The order itself is not important, as long as the same order is used both in the encoder and in the decoder. The order may, e.g., depend on a version number (preferably encoded in the encoded data stream) or definition of the object class, or be fixed left-to-right or right-to-left.

Step (307) illustrates getting the value of the field, and (308) encoding the value. Encoding the value would typically involve a recursive call to an encoding function that checks for multiple references, and encodes the value either as a reference or by recursively calling the encoding method (300). Generally encoding the value is similar to steps (204) to (209) of FIG. 2. The iteration in the encoding may actually be interleaved with and part of the recursion/iteration implemented in steps (201) to (203). Writing the program to do it is relatively easy when the iteration in steps (201) to (203) is seen as a recursive function that performs a depth-first traversal of the object graph, with detection of already visited nodes, and is well within the capabilities of a person who understands basic graph algorithms. (309) illustrates the loop condition for the iteration.

It should be noted that the encoding of values may depend on the type of each field. Rather than using generic encodings, the encodings for fields may depend on knowledge of the class definition. For example, if the class definition says that the field contains a 32-bit integer, then a special coding for 32-bit integers could be used, without encoding a type code for it.

Step (310) is entered if the object is directly codable. First, (310) checks if a definition needs to be generated, and (311) generates the definition. In most embodiments the steps (310) and (311) would probably be omitted; however, they could be used e.g. for encoding Lisp-like symbols so that the first time a symbol is encoded, a definition comprising its name is encoded, and thereafter whenever the same symbol is encoded, only a compact encoding comprising a type code and a symbol number (both preferably encoded using compressed encodings) would be generated. A similar system could be used for frequently occurring strings.

Step (312) determines the type code for the value; the type code is encoded in (313) using a compressing encoding. Some values may have special type codes allocated for them; for example, boolean values, end of list/empty list markers, some small integers, perhaps floating point 0.0 and/or 1.0, and the empty string would be good candidates for being represented with just a type code. Such values would not have any other data encoded in (314). Other value types would have additional data. In general, (314) may dispatch to a type-specific program section that generates an encoding for a value of the given type.

For example, integers could be encoded as a number of significant bits (preferably encoded using a compressing encoding, but with a context separate from the one used for encoding type codes) followed by the significant bits as-is. Sign bit could be encoded separately or e.g. the number of bits could be made negative if the value is negative. It would also be possible to have a special representation for integers that have only one or a few bits set, the representation e.g. comprising the number of significant bits and a left shift count.

List nodes could be coded as an encoded type code followed by encodings for CAR and CDR, or vice versa. It would also be possible to use more type codes for lists, such as one indicating that the CDR field is empty, or one indicating that the CAR contains a pair, followed by CAR.CAR, CAR.CDR, CDR (in some order).

Arrays could be encoded e.g. as a type code indicating element type, dimensions (for some kinds of arrays) or number of elements, and encodings for the elements (either full encodings containing type codes, or if the elements are all of the same type, perhaps a special encoding that omits the type code from the elements).

Hash tables could be encoded either as objects using the generic mechanism, or they could have a special encoding, e.g. comprising a special type code, number of mappings (or end marker after mappings), encodings for keys and corresponding values, and perhaps encodings of the allowed types of values and/or keys.

After type-specific encoding, execution continues at (315), which also indicates end of the object encoding part.

Figure 4:
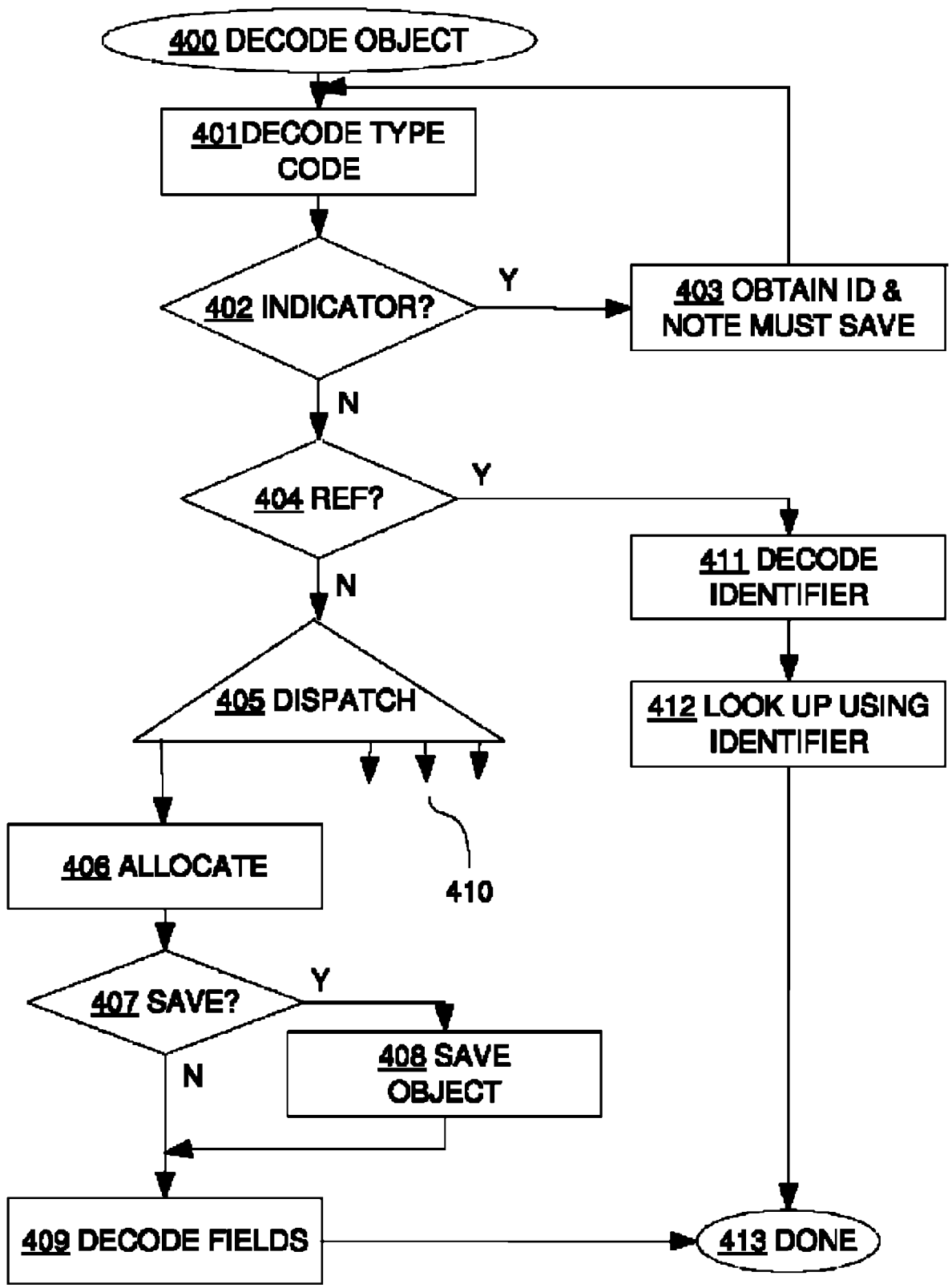
FIG. 4 illustrates converting (deserializing) a second data structure comprising packets into a first data structure comprising objects.

FIG. 4 illustrates an embodiment of the process implemented by the deserialization means (110). It is a recursive procedure starting at (400), wherein (409) may call (400) recursively. However, recursion may be eliminated as discussed above and is known in the art. In general, garbage collection may occur during the deserialization process; it is well known in the art how to protect values against garbage collection and how to control where garbage collection may occur (at GC points).

Step (401) illustrates decoding the type code. The type code is compressed using a compressing encoding that utilizes the skewed distribution of type codes. The decoding method must be compatible with the method used to encode it.

Steps (402) to (405) dispatch based on the type code. Even though (403) and (404) are shown as separate steps, they could be merged into the general dispatch (405). Not shown in the figure are tests for special type codes for definitions, whose handling would be similar to indicators (i.e., looping back to (401) without returning an object, though definitions could also be combined with a value for the defined type, in which case processing could continue from the appropriate type-specific decoding code after decoding the definition itself; the two could also be interleaved).

Step (402) checks if the type code indicates that the packet is an indicator packet meaning that the next object must be saved as it may have more than one reference. (In some embodiments indicators are not used and all objects may be saved.) (403) obtains an identifier for the object, and notes that the next object must be saved with that identifier. Obtaining the identifier may comprise decoding the identifier from the packet, or preferably it is allocated by reading an integer variable and incrementing its value. Allocating (or decoding) the identifier could also take place when saving it at (408).

Step (404) checks if the type code indicates that the packet is a reference encoding. If so, (411) decodes an identifier from the packet, and (412) looks up the corresponding object from the data structure (114). The identifier is preferably an integer.

Step (405) illustrates handling all other type codes. It basically dispatches to a type code specific section of the program. One such section is illustrated by (406) to (409); several other similar sections are represented by (410) but not otherwise shown in the figure. After performing the type code specific decoding, execution continues at step (413), where the object is returned as the decoded value.

Step (406) illustrates allocating an object of the appropriate type. For some type codes, additional data may need to be decoded before allocation; for example, array dimensions may need to be read before allocating the array, or an identifier for a class or structure type may need to be decoded first (such identifier preferably encoded using compressed encoding, but with a context distinct from the one used for encoding type codes). The object must be initialized to gc-safe values if garbage collection can occur during decoding.

Step (407) tests if this object should be saved in the data structure (114) (essentially whether (403) has been executed immediately before this object; the noting may involve e.g. setting a boolean flag or setting an identifier variable). The object is saved to (114) in (408). This also clears the note that the next value must be saved.

Step (409) decodes fields of the object in the same specific order that is used for the given object type in encoding. This would typically involve a loop that recursively calls (400) for at least some field types (field types that are encoded specially without a type code because their types are known e.g. from a class definition or array element type may be decoded directly here).

It should be noted that encoding individual objects is an area where there is a lot of room for variations. The encoding method given here is only intended as an illustration. However, it is an essential characteristic of the invention that the packet generated for an object contains a type code encoded using a compressing encoding. In the preferred embodiment, the type code is encoded at the beginning of every packet, and some packets only contain the type code.

A possible variation of the encoding is an encoding that has multiple objects encoded into a single packet. For example, lists could be encoded as a type code, length of list, and then elements of the list, as a single packet.

As described herein, it is also possible to view the packets as nested. The way fields are encoded, they could be seen as becoming part of the packet that references them, as a nested packet. In fact, some embodiments could have data specific to the type code or class identifier follow the fields encoded/ decoded in (306) to (309) and (409). In other embodiments the objects are more clearly following each other.

The data structure (114) is preferably an extensible array. An extensible array here means any data structure that can be indexed quickly (faster than performing a hash table lookup) and can be extended. Examples include a pointer to an array, with a new larger (preferably twice as large) array allocated when it becomes full, with old data copied to the new array and the pointer set to point to the new array. Another possible example is an array of fixed-size arrays, with more fixed-size arrays allocated as needed. Decoding speed is enhanced and memory requirements greatly reduced if indicator packets are used and are reasonably accurate (i.e., not very many objects indicated as potentially having multiple references when they actually have only one).

The preferred embodiment uses both indicator packets and reference encodings, uses multiple compressing encoding contexts to encode type codes, various data types and fields of various object classes, and pointers are not explicitly encoded, except when the referenced object potentially has multiple references.

A further aspect of the invention is a computer program product, stored on a machine-readable medium, the computer program product being operable to convert between a first data structure and a second data structure in a computer, causing the computer to: (a) comprise a first data structure stored in the main memory of the computer, the first data structure comprising a plurality of objects; (b) comprise a second data structure stored in a memory accessible to the computer system, the second data structure comprising a plurality of packets and being capable of causing a deserialization means in a computer to reconstruct the first data structure (or more precisely, its equivalent, as discussed above), the packets characterized by: (1) each packet comprising a type code encoded using a compressing encoding that utilizes the skewed distribution of type codes; (2) each packet comprising a variable number of bits; (3) at least some packets being non-byte-aligned; and (4) at least some packets comprising reference encodings; (c) construct one of said data structures from the other; and (d) utilize the skewed distribution of type codes in the coding of packet types.

Clearly many of the operations in the methods shown could be implemented in a different order (in addition to the alternatives already mentioned), grouped into boxes differently, or interleaved with each other, without deviating from the spirit and substance of the invention. The serialization and deserialization means could also be parallelized, encoding/decoding different parts of the respective data structures in parallel. This disclosure is intended to cover all such essentially equivalent variations, as specified in the claims.

What is claimed is:

1. A method for converting between a first data structure (106) and a second data structure (107) in a computer system, the first data structure being a data structure in main memory and the second data structure comprising a serialized representation of the first data structure, the method characterized by:
    constructing one of said data structures from the other using a conversion means (108)
    the first data structure comprising a plurality of objects stored in the main memory of the computer system, at least some said objects corresponding to packets in the second data structure
    the second data structure comprising a plurality of packets, the packets characterized by:
        each packet comprising a type code encoded using a compressing encoding that utilizes the skewed distribution of type codes
        each packet comprising of a variable number of bits
        at least some packets being non-byte-aligned
        at least some packets comprising reference encodings
    the second data structure being capable of causing a deserialization means (110) in a computer to construct a data structure equivalent to the first data structure.

2. The method of claim 1, wherein the conversion is from the first data structure to the second data structure, the method comprising:
    serializing a data structure, said serializing comprising:
        encoding at least some objects belonging to the first data structure into the second data structure
        detecting shared objects in the first data structure and encoding them only once
        upon visiting a shared object a second time, generating a reference encoding in the second data structure
    including in each packet a type code
    encoding the type code using a compressing encoding that utilizes the skewed distribution of type codes.

3. The method of claim 2, wherein at least some data objects are encoded using the steps of:
    (a) iterating over the fields of the object in a specific order
    (b) if a field does not contain a pointer, encoding the value of the field
    (c) if the field contains a pointer to a shared object, encoding it using a reference encoding
    (d) otherwise encoding the field using the normal encoding for its value, and recursively encoding its fields
    (e) repeating steps (b) to (d) for all fields of the object whereby pointers in the object have zero-length encoding, except for pointers to shared objects.

4. The method of claim 1, wherein the conversion is from the second data structure to the first data structure, the method comprising:
    decoding a type code encoded using a compressing encoding from the second data structure if the type code indicates that the next object may have multiple references, obtaining an identifier for the next object and noting that the next object must be saved otherwise, if the type code indicates a reference encoding, decoding an identifier for the referenced object, looking up the object based on the identifier, and using said object as the value of the reference otherwise, dispatching to a type-specific decoding method and decoding a value according to said type-specific decoding method, wherein at least some such type-specific decoding methods comprise:

allocating an object based on information implied by the type code and decoded by the type-specific decoding method if it has been noted that the next object must be saved, saving the allocated object using the identifier obtained for it constructing at least some objects in the first data structure from the packets decoded from the second data structure.

5. The method of claim 4, wherein at least some type-specific decoding methods further comprise:

iterating over the fields of the allocated object in a specific order for each field iterated over, recursively decoding an object from the data stream, and assigning the decoded object as the value of the field in the allocated object.

6. The method of claim 4, wherein:

obtaining an identifier for the next object comprises reading an integer variable and incrementing its value the data structure used to save and look up objects is an extensible vector.

7. The method of claim 1, further characterized by the second data structure comprising at least one reference encoding for each object in the first data structure that is referenced more than once from the first data structure.

8. The method of claim 1, wherein each packet in the second data structure is further characterized by the encoded type code being at the beginning of the packet.

9. The method of claim 8, wherein at least some packets representing objects in the first data structure consist of only the encoded type code.

10. The method of claim 1, wherein some packets in the second data structure encode indications that the following packet in the second data structure may have more than one reference.

11. The method of claim 1, wherein packets in the second data structure are ordered such that for at least some packets:

the packet for an object precedes the packets for objects referenced from it the packets for such referenced objects follow the referring object in a specific order that permits associating such objects with the corresponding fields by ordering fields into the same specific order whereby at least some pointers are encoded using zero-length encodings.

12. The method of claim 1, wherein the compressing encoding is approximate dynamic Huffman coding with periodic regeneration and precomputing.

13. The method of claim 1, wherein the compressing encoding is arithmetic coding.

14. A computer system comprising:

a first data structure comprising a plurality of objects stored in the main memory of the computer system, the data structure used by at least one application program executing on the computer system a second data structure comprising a plurality of packets stored in a memory accessible to the computer system, the second data structure being capable of causing a deserialization means in a computer to reconstruct the first data structure, the packets characterized by:

each packet comprising a type code encoded using a compressing encoding that utilizes the skewed distribution of type codes each packet comprising a variable number of bits at least some packets being non-byte-aligned at least come packets comprising reference encodings a means for constructing one of said data structures from the other a means for processing encoded type codes using a compressing encoding that utilizes the skewed distribution of type codes.

15. The computer system of claim 14, further characterized by the second data structure comprising at least one reference encoding for each object in the first data structure that is referenced more than once from the first data structure.

16. The computer system of claim 14, wherein each packet starts with an encoded type code.

17. The computer system of claim 14, wherein at least some packets consist of only the encoded type code.

18. The computer system of claim 14, wherein some packets encode indications that the following packet in the second data structure may have more than one reference.

19. The computer system of claim 14, further comprising a means for processing encoded type codes comprises using approximate dynamic Huffman coding with periodic regeneration and precomputing.

20. A computer program product, stored on a machine-readable medium, the computer program product being operable to convert between a first data structure and a second data structure in a computer, causing the computer to:

comprise a first data structure stored in the main memory of the computer, the first data structure comprising a plurality of objects comprise a second data structure stored in a memory accessible to the computer system, the second data structure comprising a plurality of packets and being capable of causing a deserialization means in a computer to reconstruct the first data structure, the packets characterized by:

each packet comprising a type code encoded using a compressing encoding that utilizes the skewed distribution of type codes each packet comprising a variable number of bits at least some packets being non-byte-aligned at least some packets comprising reference encodings construct one of said data structures from the other utilize the skewed distribution of type codes in the coding of packet types.

\* \* \* \* \*